(12) United States Patent
Maandi

(10) Patent No.: US 6,632,908 B1
(45) Date of Patent: Oct. 14, 2003

(54) BONDING SYSTEM HAVING ADHERENCE TO LOW ENERGY SURFACES

(75) Inventor: Eerik Maandi, Rocky Hill, CT (US)

(73) Assignee: Henkel Loctite Corporation, Rocky Hill, CT (US)

( * ) Notice: Subject to any disclaimer, the term of this patent is extended or adjusted under 35 U.S.C. 154(b) by 0 days.

(21) Appl. No.: 10/094,817

(22) Filed: Mar. 12, 2002

(51) Int. Cl.⁷ .............................................. C08F 118/02
(52) U.S. Cl. ...................... 526/319; 526/171; 526/196; 526/198; 526/229; 526/230; 526/236; 526/204; 526/217; 526/90; 526/93
(58) Field of Search ................................. 526/319, 171, 526/196, 198, 229, 230, 236, 90, 93, 204, 217

(56) References Cited

U.S. PATENT DOCUMENTS

| | | | |
|---|---|---|---|
| 3,753,927 A | 8/1973 | Kracklauer | 252/428 |
| 4,076,742 A | 2/1978 | Berlin et al. | 260/47 UA |
| 4,460,719 A | 7/1984 | Danville | 523/508 |
| 4,525,232 A | 6/1985 | Rooney et al. | 156/273.3 |
| 4,533,446 A | 8/1985 | Conway et al. | 204/159.24 |
| 4,536,546 A | 8/1985 | Briggs | 525/83 |
| 4,581,427 A | 4/1986 | Dunn et al. | 526/147 |
| 4,942,201 A | 7/1990 | Briggs et al. | 525/71 |
| 5,935,711 A | 8/1999 | Pocius et al. | 428/421 |
| 5,990,036 A | 11/1999 | Deviny | 502/162 |
| 6,329,442 B1 | 12/2001 | Sugita et al. | 522/7 |

FOREIGN PATENT DOCUMENTS

| | | | |
|---|---|---|---|
| WO | WO 99/64528 | 12/1999 | C09J/4/00 |
| WO | WO 01/44311 | 6/2001 | C08F/4/52 |

*Primary Examiner*—Tatyana Zalukaeva
(74) *Attorney, Agent, or Firm*—Steven C. Bauman

(57) ABSTRACT

The present invention is directed to (meth)acrylate compositions useful for bonding substrates including metals, plastics, and glass to similar or different substrates, in particular, low energy surfaces. The invention also provides an initiator system for (meth)acrylate based adhesives; a kit for bonding substrates, at least one of which includes a low energy surface; a resultant bonded assembly; and a method of bonding low energy substrates. A (meth)acrylate composition within the present invention includes a (meth)acrylate component and an initiator system including an organometallic compound, a peroxy compound, an aziridine functionalized compound, and a compound having an acid functional group.

9 Claims, No Drawings

BONDING SYSTEM HAVING ADHERENCE TO LOW ENERGY SURFACES

BACKGROUND OF THE INVENTION

1. Field of the Invention

This invention relates to (meth)acrylate based polymerizable compositions and adhesive systems. The polymerizable compositions and adhesive systems also include an organometallic compound and a peroxide compound. The inventive polymerizable compositions and adhesive systems are particularly well suited to bonding applications which involve at least one low energy bonding surface, for example, polyolefin, polyethylene, and polypropylene surfaces.

2. Brief Description of Related Technology

Low energy surfaces such as polyolefins, i.e, polyethylene, polypropylene, polybutene, polyisoprene, and copolymers thereof, are well known to be difficult to bond to each other and to other surfaces using adhesive bonding technology since they have few active bonding sites available at the free surfaces. Low energy surfaces are defined as those having surface energies less than 45 mN/m, more typically less than 40 mN/m, or less than 35 mN/m.

It is known to enhance the bonding of low energy bonding surfaces by surface pre-treatments such as flame treatments, plasma treatments, oxidation, sputter etching, corona discharge, or primer treatments with a high surface energy material. Such treatments disrupt the bonds at the surface of the low energy material providing sites which are reactive and which can participate in bonding reactions with adhesive materials. However, such surface pre-treatments are usually undesirable, they add costs, they are not particularly reproducible in their results, and the effect of the pre-treatments wears off with time so the pre-treated surfaces must be re-treated if they are not bonded within a reasonable period of time. These pre-treatments are also not generally suited for the consumer market.

The patent literature reports one and two-part bonding compositions which often times contain a very reactive boron compound as an initiator. For instance, PCT International Patent Application WO 99/64528 refers to a polymerizable composition for bonding low energy surface substrates comprising a monomer blend and an organoborane aerobic initiator. U.S. Pat. No. 5,990,036 to Deviny refers to an initiator system for polymerizing acrylic monomers comprising organoborane-anine complexes and a decomplexer. U.S. Pat. No. 5,935,711 to Pocius et al. refers to an organoborane amine complex initiator system, which organoborane amine complex initiator system further contains an aziridine functional material and an acid functional compound as a decomplexer. U.S. Pat. No. 6,329,442 to Sugita refers to an organic boron compound and an acidic compound with the addition of a hexaarylbiimidazole compound as a polymerization initiator for fiber reinforced resins. PCT International Patent Application WO 01/44311 refers to an amine organoborane complex as a polymerization initiator for one or more free radical polymerizable monomers, oligomers or polymers; a separate decomplexer may be needed depending upon the temperature of the composition.

Other initiator systems found in the patent literature include U.S. Pat. No. 4,460,719 to Danville which refers to polyester-based adhesive compositions using peroxides as hardeners for automotive body repair applications. U.S. Pat. Nos. 4,536,546 and 4,942,201 to Briggs and Briggs et al., respectively, refer to an adhesive composition, which uses a peroxy compound with catalyst activators such as aldehyde-amine condensation products, and organic sulfonyl chlorides. Transition metal compounds may be added as promoters. U.S. Pat. No. 4,581,427 to Dunn et al. teaches an adhesive composition comprising a cure system of benzoyl peroxide, ferrocene and a tertiary aromatic amine. U.S. Pat. No. 4,533,446 to Conway et al. teaches a one part UV activated anaerobic adhesive composition. U.S. Pat. No. 4,525,232 to Rooney et al. teaches an initiator system comprising a peroxy compound, ferrocene, and an acid, wherein vinyl ether monomers are added as inhibitors. U.S. Pat. No. 4,076,742 to Berlin et al. refers to an initiator system including benzoyl peroxide combined with ferrocene for an anaerobic composition wherein the polymerizable oligomer is at least one oligocarbonateacrylate. U.S. Pat. No. 3,753,927 to Kracklauer refers to the peroxide induced cure of polyester resins employing a promoter system having a ferrocenyl compound and a member selected from various phosphorus compounds, an ascorbic acid compound, a stannous salt or soap, and an ammonium or alkali metal hydrogen sulfite.

Notwithstanding the state of the technology, it would be desirable to provide another alternative to the end user seeking to bond low energy surfaces without the need for surface pre-treatments, which is a (meth)acrylate-based composition.

SUMMARY OF THE INVENTION

The present invention, in a first aspect, provides a (meth)acrylate composition, which includes:

a (meth)acrylate component;

a first initiator system for initiating polymerization of the (meth)acrylate component including
  an organometallic compound; and
  a peroxy compound; and a second initiator system for initiating polymerization of the (meth)acrylate component including
  an aziridine functionalized compound; and
  a compound having an acid functional group.

In another aspect, the present invention is directed to a (meth)acrylate composition in a two-part system including:

a first part including a (meth)acrylate component, an organometallic compound, and an aziridine functionalized compound; and a second part including a (meth)acrylate component, a peroxy compound, and a compound having an acid functional group.

In yet another aspect, the present invention is directed to an initiator system for (meth)acrylate based adhesive compositions useful in bonding low energy surfaces. The initiator system includes:

an organometallic compound represented by Formula VI:

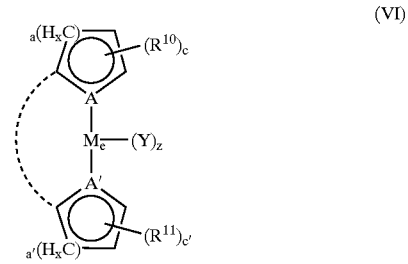

(VI)

where
  the dashed line optionally represents one or more bonds to form a five or six membered ring system;
  $M_e$ is a transition metal;
  $R^{10}$ and $R^{11}$ are same or different and each is a member selected from hydrogen, a straight or branched chain alkyl group having from about 1 to about 8 carbon atoms, acetyl, vinyl, allyl, hydroxyl, carboxyl, —$(CH_2)_b COOR^{12}$, and —$(CH_2)_b OH$;
  where
    $R^{12}$ is a straight or branched chain alkyl group having from about 1 to about 8 carbon atoms, hydrogen, lithium, sodium or —$(CH_2)_b$—$OR^{13}$;
    b is 1 to 8;
      $R^{13}$ is a straight or branched chain alkyl group having from about 1 to about 8 carbon atoms or —$(CH_2)_b N^+(CH_3)_3 X^-$; and
  X is a halogen, $ClO_4^-$, or $BF_4^-$;
  Y is hydrogen, halogen, cyano, an alkoxy group having about 1 to about 4 carbon atoms, acetyl, hydroxyl, nitro, a trialkylamine, a triarylamine, a trialkylphosphine, or tosyl;
  z is 0 up to an available valence of $M_e$;
  x is 1 or 2;
  a and a' are same or different and each is 1 or 2;
  c and c' are same or different and each is 1 to 5 with the proviso that if a or a' is 1, then c and c' are each not greater than 4, and if a or a' is 2, then c and c' are each not greater than 5; and
  A and A' are same or different and each is carbon or nitrogen; and
  a peroxy compound selected from organic peroxides, organic hydroperoxides, peresters, peracids, or mixtures thereof.

Preferably, the initiator system of the current aspect of the present invention further includes a second initiator system including an aziridine functionalized compound and a compound having an acid functional group. It may also further include a polymerizable (meth)acrylate component.

In still yet another aspect, the present invention is directed to a kit useful for bonding substrates, at least one of which includes a low free energy surface to be bonded, including:
  a first part including
    a (meth)acrylate component;
    a metallocene compound; and
    an aziridine functionalized compound; and
  a second part, separate from the first part, including
    a (meth)acrylate component;
    a peroxy compound; and
    a compound having an acid functional group,
where upon mixing contents of the first part and the second part, a polymerizable mixture is formed capable of bonding the substrates, at least one of which includes a low free energy surface to be bonded. Preferably, the kit provides separate compartments for the first and second parts.

In a further aspect, the present invention is directed to a bonded assembly including:
  at least two articles bonded together with a (meth)acrylate based adhesive, which includes
    a (meth)acrylate component;
    an initiator system for initiating polymerization of the (meth)acrylate component including
      a metallocene compound; and
      a peroxy compound;
    an aziridine functionalized compound; and
    a compound having an acid functional group,
where an average shear strength of a bond between the at least two articles is greater than about 200 psi.

Desirably, the at least two articles include low surface energy articles such as, for example, polyolefins, polypropylene, or polyethylene, and wherein the at least two articles are the same or different.

In still a further aspect, the present invention is directed to a method of bonding low energy substrates including the steps of:
  providing at least two substrates;
  providing a (meth)acrylate adhesive composition, which includes
    a (meth)acrylate component;
    a dual two-part initiator system including a metallocene, a peroxy compound, an aziridine functionalized compound, and a compound having an acid functional group;
  applying, on at least a portion of a surface of a first of the at least two substrates, the (meth)acrylate adhesive composition;
  contacting the (meth)acrylate adhesive composition-coated surfaces of the at least two susbtrates;
  curing the (meth)acrylate adhesive composition to provide a bond shear strength between the at least two substrates of greater than about 200 psi.

DETAILED DESCRIPTION OF THE INVENTION

As used herein, the terms (meth)acrylate and (meth)acrylic are used synonymously with regard to the monomer and monomer-containing component. The terms (meth)acrylate and (meth)acrylic include acrylate methacrylate, acrylic, and methacrylic.

The present invention relates to polymerizable (meth)acrylate compositions and adhesive systems including the (meth)acrylate compositions having dual two-part initiator systems. In one embodiment of the present invention, a multi-part adhesive system including the (meth)acrylate composition is mixed immediately prior to application and upon mixing, the dual initiator systems promote free-radical polymerization or curing of the (meth)acrylate composition resulting in the formation of a polymeric adhesive material which strongly adheres to surfaces, particularly low energy surfaces such as polyolefins. The first initiator system includes an organometallic compound, such as a metallocene based compound, and a peroxy compound. The second initiator system includes a compound having an acid functional group and an aziridine functionalized compound. The polymerization reaction promoted by the initiator systems also causes bonding of the adhesive to the surfaces being bonded. The speed and extent of the polymerization can be controlled by controlling the ratio of the various constituents and the temperature. The multi-part adhesive system of the present invention has shown average bond strengths to low energy surface materials such as polyethylene and polypropylene in excess of about 200 psi. This is a higher bond strength for polyethylene and polypropylene substrates than has previously been attained with multi-part (meth)acrylate adhesive systems except by those containing boron compounds.

The adhesive compositions disclosed herein are useful for bonding a large range of substrates including metals, plastics and glass to similar or different substrates and perform better than most previously available two-part (meth)acrylate based adhesives on many of these substrates, especially low energy surfaces having a surface energy of less than 45 mN/m. These low energy surfaces include polyolefins, for example, polyethylene and polypropylene, acrylonitrile-butadiene-styrene, polytetrafluoroethylene, or relatively low surface energy substrates such as polycarbonate, to similar substrates, to each other, or to different substrates including metals, other plastics, and glass.

Also disclosed herein are kits including the (meth)acrylate compositions for use as adhesive systems, the resultant bonded assembly using the (meth)acrylate based adhesive system of the present invention, and a method of bonding low energy substrates with the (meth)acrylate based adhesive system of the present invention.

The ethylenically unsaturated, free radical polymerizable monomers in the polymerizable composition of the present invention preferably include addition polymerizable, non-gaseous (boiling temperature above 100° C. at normal atmospheric pressure), ethylenically unsaturated organic compounds containing at least one, and preferably at least two, terminal ethylenically unsaturated groups, and being capable of forming a high weight average molecular weight polymer by free radical initiated, chain propagating addition polymerization.

The most preferred compounds are acrylate or (meth) acrylate monomers, as are well known in the art. Suitable polymerizable monomers nonexclusively include triethylene glycol dimethacrylate, tripropylene glycol diacrylate, tetraethylene glycol dimethacrylate, diethylene glycol dimethacrylate, 1,4-butanediol diacrylate, 1,6-hexanediol dimethacrylate, pentaerythritol tetraacrylate, trimethylol propane triacrylate, trimethylol propane trimethacrylate, dipentaerythritol monohydroxypentaacrylate, pentaerythritol triacrylate, bisphenol-A-ethoxylate dimethacrylate, trimethylolpropane ethoxylate triacrylate, trimethylolpropane propoxylate triacrylate, and bisphenol-A-diepoxide dimethacrylate.

Preferably, the (meth)acrylate component includes one or more members selected from a monomer represented by Formula I:

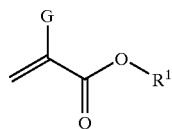

(I)

where G is hydrogen, halogen, or an alkyl having from 1 to 4 carbon atoms, $R^1$ has from 1 to 16 carbon atoms and is an alkyl, cycloalkyl, alkenyl, cycloalkenyl, alkaryl, aralkyl, or aryl group, optionally substituted or interrupted with silane, silicon, oxygen, halogen, carbonyl, hydroxyl, ester, carboxylic acid, urea, urethane, carbamate, amine, amide, sulfur, sulfonate, or sulfone;

a di- or tri-(meth)acrylate including polyethylene glycol di(meth)acrylates, bisphenol-A di(meth) acrylates, tetrahydrofurane di(meth)acrylates, hexanediol di(meth)acrylate, trimethylol propane tri(meth)acrylate, or combinations thereof; and an acrylate ester represented by Formula II:

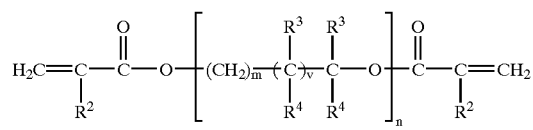

(II)

where $R^2$ is hydrogen, halogen, or an alkyl having about 1 to about 4 carbon atoms, $R^3$ is hydrogen, an alkyl having about 1 to about 4 carbon atoms, hydroxy-alkyl having about 1 to about 4 carbon atoms or

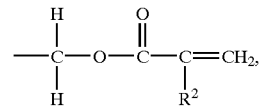

$R^4$ is hydrogen, hydroxy or

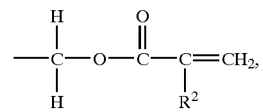

and m is to 8, n is 1 to 20, and v is 0 or 1.

Preferably, the (meth)acrylate component includes polyethylene glycol di(meth)acrylates, bisphenol-A di(meth) acrylates, tetrahydrofurane (meth)acrylates and di(meth) acrylates, citronellyl acrylate and citronellyl methacrylate, hydroxypropyl (meth)acrylate, hexanediol di(meth)acrylate, trimethylol propane tri(meth)acrylate, tetrahydrodicyclopentadienyl (meth)acrylate, ethoxylated trimethylol propane triacrylate, triethylene glycol acrylate, triethylene glycol methacrylate, and combinations thereof.

Other suitable acrylate esters are represented by Formula III:

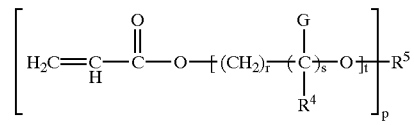

(III)

where r is zero or a positive integer, s is zero or 1, t is an integer from 1 to 20, and p is 2, 3 or 4. G and $R^4$ are as defined above. $R^5$ denotes an organic radical of valency s linked through a carbon atoms or carbon atoms thereof to the indicated t number of oxygen atoms. Preferably, r, s, and t are 1, G is hydrogen or methyl, and $R^5$ is a hydrocarbon residue of an aliphatic polyhydric alcohol having from 2 to 6 carbon atoms, such as a pentaerythrityl group. A specific example of such compounds is pentaerythrityl tetrakis (dimethylene glycol acrylate).

Yet other suitable esters are those of Formula IV:

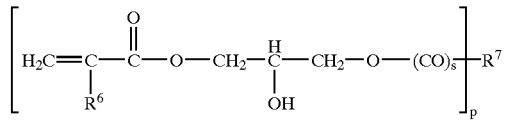

(IV)

where s and p have the meanings previously assigned, $R^6$ is hydrogen or methyl, and $R^7$ is an organic radical of valency p, linked through a carbon atom thereof other than the carbon atom of a carbonyl group. More particularly, when s is zero, $R^7$ may denote the residue, containing from 1 to 60 carbon atoms, of an alcohol or phenol having p hydroxyl groups. $R^7$ may thus represent an aromatic, araliphatic, alkaromatic, cycloaliphatic, heterocyclic, or heterocycloaliphatic group, such as an aromatic group containing only one benzene ring, optionally substituted by chlorine, bromine or an alkyl group of from 1 to 9 carbon atoms, or an aromatic group including a chain of two to four benzene rings, optionally interrupted by ether oxygen atoms, aliphatic hydrocarbon groups of 1 to 4 carbon atoms, or sulphone groups, each benzene ring being optionally substituted by chloride, bromine or an alkyl group of from 1 to 9 carbon atoms, or a saturated or unsaturated, straight or branched-chain aliphatic group, which may contain ether oxygen linkages and which may be substituted by hydroxyl groups, especially a saturated or monoethylenically unsaturated straight chain aliphatic hydrocarbon group of from 1 to 8 carbon atoms.

Specific examples of such groups are the aromatic groups of the formulae —$C_6H_4C(CH_3)_2C_6H_4$—, in which case p is 2, and —$C_6H_4(CH_2C_6H_3—)_w$—$CH_2C_6H_4$— wherein w is 1 or 2, in which case p is 3 or 4, and the aliphatic groups of formula —$CH_2CHCH_2$— or —$CH_2CH(CH_2)_3CH_2$—, in which case p is 3, or of formula —$(CH_2)_4$—, —$CH_2CH=CHCH_2$—, —$CH_2CH_2OCH_2CH_2$—, or —$(CH_2CH_2O)_2CH_2CH_2$—, in which case p is 2. When s is 1, $R^7$ may represent the residue, containing from 1 to 60 carbon atoms, of an acid having p carboxyl groups, preferably a saturated or ethylenically unsaturated, straight chain or branched aliphatic hydrocarbon group of from 1 to 20 carbon atoms, which may be substituted by chlorine atoms and which may be interrupted by ether oxygen atoms and/or by carbonyloxy (—COO—) groups, or a saturated or ethylenically unsaturated cycloaliphatic or aliphatic-cycloaliphatic hydrocarbon group of at least 4 carbon atoms, which may be substituted by chlorine atoms, or an aromatic hydrocarbon group of from 6 to 12 carbon atoms which may be substituted by chlorine or bromine atoms.

Further preferred compounds wherein s is 1 are those in which $R^7$ represents a saturated or ethylenically unsaturated straight chain or branched aliphatic hydrocarbon group of from 1 to 8 carbon atoms, optionally substituted by a hydroxyl group, or a saturated or ethylenically unsaturated straight chain or branched aliphatic hydrocarbon group of from 4 to 50 carbon atoms and interrupted in the chain by carbonyloxy groups, or a saturated or ethylenically unsaturated monocyclic or bicyclic cycloaliphatic hydrocarbon group of 6 to 8 carbon atoms, or an ethylenically unsaturated cycloaliphatic-aliphatic hydrocarbon group of from 10 to 51 carbon atoms, or a mononuclear aromatic hydrocarbon group of from 6 to 8 carbon atoms. Specific examples of these residues of carboxylic acid are those of formula —$CH_2CH_2$—, CH=CH—, and —$C_6H_4$— where p is 2.

Specific examples of suitable compounds of the preceding formula are epoxy acrylates such as 1,4-bis(2-hydroxy-3 (acryloyloxy)propoxy)butane, poly(2-hydroxy-3-(acryloyloxy)propyl)ethers of bis(4-hydroxyphenyl) methane (bisphenol F), 2,2-bis(4-hydroxyphenyl)propane (bisphenol A) and phenol-formaldehyde novolaks, bis(2-hydroxy-3-acryloyloxypropyl)adipate and the methacryloyloxy analogues of these compounds.

Still other suitable esters are urethane acrylates and ureide acrylates represented by Formula (V):

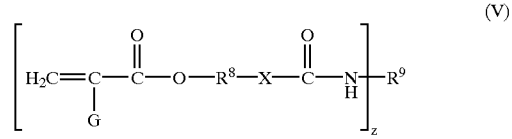

(V)

wherein, G has the meaning assigned above, $R^8$ denotes a divalent aliphatic, cycloaliphatic, aromatic, or araliphatic group, bound through a carbon atom or carbon atoms thereof indicated at the —O— atom and —X— atom or group, X denotes —O—, —NH—, or —N(alkyl)-, in which the alkyl radical has from 1 to 8 carbon atoms, z is an integer of at least 2 and at most 6, and $R^9$ denotes a z-valent cycloaliphatic, aromatic, or araliphatic group bound through a carbon atom or carbon atoms thereof to the indicate NH groups. Preferably, $R^8$ denotes a divalent aliphatic group of 2 to 6 carbon atoms and $R^9$ denotes one of the following: a divalent aliphatic group of 2 to 10 carbon atoms, such as a group of formula: —$(CH_2)_6$—, $CH_2C(CH_3)_2CH_2CH(CH_3)$ $(CH_2)$—, or —$CH_2CH(CH_3)CH_2C(CH_3)_2CH_2)_2$—; or a phenylene group, optionally substituted by a methyl group or a chlorine atom; a naphthylene group; a group of formula: —$C_6H_4C_6H_4$—, $C_6H_4CH_2C_6H_4$—, or —$C_6H_4C(CH_3)_2$ $C_6H_4$—; or a mononuclear alkylcycloalkylene or alkylcycloalkylalkylene group of from 6 to 10 carbon atoms, such as a methylcyclohex-2,4-ylene, methylcyclohex-2,6-ylene, or 1,3,3-trimethylcyclohex-5-ylenemethyl group. Specific examples include 2,4- and 2,6-(bis(2-acryloyloxyethoxy carbonamido)toluene and the corresponding methacryloyloxy compounds.

The (meth)acrylate component should be present in the inventive compositions in an amount within the range of from about 10 wt. % to about 90 wt. %, preferably about 20 wt. % to about 85 wt. %, based on a total weight of the composition.

The (meth)acrylate component may further include a member selected from the group of stabilizers, accelerators, fillers, opacifiers, thickeners, viscosity modifiers, adhesion promoters, inhibitors, thixotrophy conferring agents, tougheners, anti-oxidizing agents, anti-reducing agents, and combinations thereof. In the case of UV radiation curable compositions, photoinitiators would be added. These optional additives are used in an amount that do not significantly adversely affect the polymerization process or the desired properties of the cured composition.

The first initiator system of the present invention includes an organometallic compound such as a metallocene, which accelerates cure of the (meth)acrylate composition, and a peroxy compound which initiates polymerization of the (meth)acrylate composition. Decomposition of the peroxy compound is initiated by the organometallic compound which results in free radical polymerization of the (meth) acrylate component. The organometallic compound, or metallocene, may be represented by Formula VI:

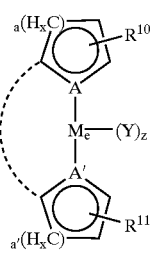

(VI)

where
the dashed line optionally represents one or more bonds to form a five or six membered ring system;

$M_e$ is a transition metal;

$R^{10}$ and $R^{11}$ are same or different and each is a member selected from hydrogen, a straight or branched chain alkyl group having from about 1 to about 8 carbon atoms, acetyl, vinyl, allyl, hydroxyl, carboxyl, $-(CH_2)_b COOR^{12}$, and $-(CH_2)_b OH$;

where
$R^{12}$ is a straight or branched chain alkyl group having from about 1 to about 8 carbon atoms, hydrogen, lithium, sodium or $-(CH_2)_b-OR^{13}$;

b is 1 to 8;

$R^{13}$ is a straight or branched chain alkyl group having from about 1 to about 8 carbon atoms or $-(CH_2)_b N^+(CH_3)_3 X^-$; and X is a halogen, $ClO_4^-$, or $BF_4^-$;

Y is hydrogen, halogen, cyano, an alkoxy group having about 1 to about 4 carbon atoms, acetyl, hydroxyl, nitro, a trialkylamine, a triarylamine, a trialkylphosphine, or tosyl;

z is 0 up to an available valence of $M_e$;

x is 1 or 2;

a and a' are same or different and each is 1 or 2;

c and c' are same or different and each is 1 to 5 with the proviso that if a or a' is 1, then c and c' are each not greater than 4, and if a or a' is 2, then c and c' are each not greater than 5; and A and A' are same or different and each is carbon or nitrogen.

Another embodiment of the organometallic compound of Formula VI is represented by Formula VII:

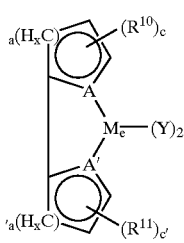

(VII)

where
$M_e$ is a metal selected from iron, titanium, chromium, copper, manganese, silver, zirconium, hafnium, niobium, vanadium, and molybdenum;

$R^{10}$ and $R^{11}$ are each hydrogen;

Y is halogen;

x is 1 or 2;

a and a' are each 2;

c and c' are each 1 to 5; and

A and A' are each nitrogen.

Still yet another preferred embodiment of the organometallic compound of Formula VI is represented by Formula VIII:

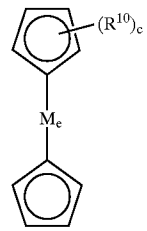

(VIII)

wherein
$M_e$ is a metal selected from iron, titanium, chromium, copper, manganese, silver, zirconium, hafnium, niobium, vanadium, and molybdenum; and $R^{10}$ is a member selected from hydrogen, a straight or branched chain alkyl group having from about 1 to about 8 carbon atoms, acetyl, vinyl, allyl, hydroxyl, carboxyl, $-(CH_2)_b COOR^{12}$, and $-(CH_2)_b OH$;

where
$R^{12}$ is a straight or branched chain alkyl group having from about 1 to about 8 carbon atoms, hydrogen, lithium, sodium or $-(CH_2)_b-OR^{13}$;

b is 1 to 8;

$R^{13}$ is a straight or branched chain alkyl group having from about 1 to about 8 carbon atoms or $-(CH_2)_b N^+(CH_3)_3 X^-$;

X is a halogen, $ClO_4^-$, or $BF_4^-$; and c is 1 to 5.

Preferably, $M_e$ is a transition metal selected from the group of iron, titanium, ruthenium, cobalt, nickel, chromium, copper, manganese, palladium, silver, rhodium, platinum, zirconium, hafnium, niobium, vanadium, and molybdenum. Of course, depending on the valence state, $M_e$ may have additional Y ligands associated therewith beyond the carbocyclic ligands, when z is greater than 1, such as, for example, when $M_e$ is titanium and Y may be chloro-. $M_e$ is more preferably titanium, chromium, copper, iron, manganese, ruthenium, silver, zirconium, hafnium, niobium, vanadium, and molybdenum.

Desirably, the metallocene is selected from ferrocenes wherein $M_e$ is iron such as ferrocene, vinyl ferrocenes, ferrocene derivatives such as butyl ferrocenes, diarylphosphino metal-complexed ferrocenes, e.g., 1,1-bis(diphenylphosphino)ferrocene-palladium dichloride; titanocenes wherein $M_e$ is titanium such as bis($\square^5$-2,4-cyclopentadien-1-yl)-bis-[2,6-difluoro-3-(1H-pyrrol-1-yl)phenyl]titanium which is available commercially from Ciba Specialty Chemicals, Tarrytown, N.Y., under the tradename IRGACURE® 784DC, and derivatives and combinations thereof. A particularly desirable metallocene is ferrocene.

Bis-alkylmetallocenes such as bis-alkylferrocenes, e.g., diferrocenyl ethane, propanes, butanes and the like, are also desirable for use herein, particularly since about half of the equivalent weight of the material (as compared to a non-bis-metallocene) may be employed to obtain the sought-after results, all else being unchanged. Of these materials, diferrocenyl ethane is particularly desirable.

Of course, other materials are well-suited for use, such as $M_e[CZ_3-CO-CH=C(O^-)-CZ'_3]_2$, where $M_e$ is as defined above, and Z and Z' may be the same or different and may be hydrogen or halogen, such as fluorine and chlorine. Examples of such materials include platinum (II) acetylacetonate ("PtAcAc"), cobalt (II) acetylacetonate ("Co(II) AcAc"), cobalt (III) acetylacetonate ("Co(III)AcAc"), nickel (II) acetylacetonate ("NiAcAc"), iron (II) acetylacetonate ("Fe(II)AcAc"), iron (III) acetylacetonate ("Fe(III) AcAc"), chromium (II) acetylacetonate ("Cr(II)AcAc"), chromium (III) acetylacetonate ("Cr(III)AcAc"), manganese (II) acetylacetonate ("Mn(II)AcAc"), manganese (III) acetylacetonate ("Mn(III)AcAc") and copper (II) acetylacetonate ("CuAcAc").

Combinations of these transition metal complexes may also be employed in the first initiator system. The organometallic compound should be present in an amount of about 0.03 wt. % to about 0.5 wt. %, preferably about 0.06 to about 0.3 wt. %, and more preferably about 0.1 wt. % to about 0.3 wt. % based on a total weight of the (meth)acrylate composition.

The peroxy compounds of the first initiator system may include hydroperoxides, peracids, and peresters. Examples of useful peroxy compounds may be cumene hydroperoxide, cyclohexane hydroperoxide, methylethylketone hydroperoxide, benzoyl peroxide, p-chlorobenzoyl peroxide, o-methylbenzoyl peroxide, lauroyl peroxide, t-butyl perbenzoate, 2,2-bis(t-butylperoxy)butane, 1,1-bis(t-butylperoxy)benzene, bis(t-butylperoxyisopropyl)benzene, t-butyl permaleate, and mixtures thereof. The peroxy compound may be present in the (meth)acrylate composition of the present invention in an amount from about 0.5 wt. % to about 5.0 wt. %, and preferably from 0.5 wt. % to about 3.0 wt. % based on a total amount of the composition.

Amine additives known to one of ordinary skill in the art as accelerators may also be added to the first initiator system.

The second initiator system as part of the (meth)acrylate based adhesive system of the present invention includes a compound having an acid functional group and an aziridine functionalized compound. The aziridine functionalized compound has at least one aziridine ring or group:

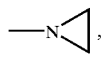

wherein the carbon atom(s) may be optionally substituted with short chain alkyl groups having from one to ten carbon atoms, preferably methyl, ethyl or propyl such that methyl, ethyl or propyl aziridine moieties are formed. Polydifunctional aziridines such as trimethylolpropane tris-(2-methyl-1-aziridine propionate) are particularly useful. A mixture of compounds having an aziridine functional group may be used. The aziridine functionalized compound acts as a cross-linking agent in the polymerizable composition since it copolymerizes with the acid and the (meth)acrylate monomers. The aziridine functionalized compound is preferably soluble in the (meth)acrylate monomers, such that the parts of a multi-part adhesive system can be readily mixed. By "soluble" is meant that no evidence of gross phase separation at room temperature, i.e., about 22° C. to about 25° C., is visible to the unaided eye. Suitably, the aziridine functionalized compound is a liquid at or near room temperature, i.e., within about 10° C. of room temperature. The aziridine functionalized compound is present in an amount of less than about 25 wt. %, preferably less than about 10 wt. %, and more preferably less than about 5 wt. % based on a total weight of the (meth)acrylate composition.

The compound having an acid functional group may suitably be a weak acid. Lewis acids may also be used. The pKa of the weak acid normally is no lower than about 0.5 with the desirable limit being about 0.9. The upper limit normally is about 13, or less, such as about 11.5. Carboxylic acids, which have a pKa of up to about 8, such as about 6 or about 7, are particularly useful.

The compound having an acid functional group should be present in a sufficient amount to initiate polymerization of the monomer and continue to propagate in order to achieve a molecular weight of the polymer appropriate for the desired application. Polymerization occurs as a result of the ring opening of the aziridine functionalized compound. Too little of the compound having an acid functional group would result in a relatively weak polymer with low strength since the aziridine functionalized compound, without the ring opening, is not cross-linked into the polymer. An effective amount of the acid, acidic monomer or acid residue is about 0.1 to about 25 wt. %, preferably from about 0.1 to about 20 wt. %, and more preferably from about 0.5 to about 5 wt. % based on a total weight of the (meth)acrylate composition. A mixture of acids may also be used.

Suitable acids may be monobasic or polybasic. Examples of suitable acids are formic acid, acetic acid, propionic acid, maleic acid, malic acid, fumaric acid, acrylic acid and copolymers thereof, methacrylic acid and copolymers thereof, pyruvic acid, itaconic acid, nadic acid, benzoic acid, phthalic acids, cinnamic acid, trichloroacetic acid, and saccharin. It is particularly suitable to use an acidic monomer which can itself be polymerized, so that it is bound into the cured (meth)acrylate composition. An example of such an acidic monomer is a part-ester of a polyfunctional acid wherein the ester group contains a free radically polymerizable component, particularly a (meth)acrylic half ester of a difunctional acid such as maleic, fumaric or succinnic acid, e.g., 2-(meth)acryloyloxyethyl maleate, 2-(meth) acryloxyethyl fumarate or 2-(meth)acryloxyethyl succinate. The acid may also be present as a latent acid, particularly a masked carboxylic acid compound hydrolyzable on contact with moisture, such as an acid anhydride.

In one embodiment of the adhesive system of the present invention, a two-part adhesive system may include a first part, Part A, which includes the organometallic compound along with one or more (meth)acrylate monomer(s), and the compound having at least one aziridine functional group. Other materials such as tougheners, fillers, thickeners, colorants, pigments, transition metal salts, and free radical polymerization stabilizers may also be present. The second part of the adhesive system, Part B, includes the peroxy compound along with one or more (meth)acrylate monomer (s), and the acid. Optionally one or more of the tougheners, fillers, thickeners, colorants, pigments, transition metal salts, and free radical polymerization stabilizers mentioned above with respect to Part A may be added to Part B as well.

Optional additives, as mentioned above, to the (meth) acrylate compositions and adhesive systems of the present invention may include tougheners, fillers, thickeners, colorants, pigments, transition metal salts, and free radical polymerization stabilizers. The optional additives are used in an amount that do not significantly adversely affect the polymerization process or the desired properties of polymerization products made thereby.

The physical properties of the resultant polymerized (meth)acrylate composition may be modified by adding tougheners. Suitable tougheners include elastomeric materials such as polybutadiene rubbers, polyisoprene, available under the trade name KRATON® from Shell Chemical Corp., Houston, Tex., acrylonitrile-butadiene-styrene ("ABS"), available under the trade name HYCAR® from BF Goodrich, Charlotte, N.C., or as core-shell polymers under the trade name BLENDEX® from GE Plastics, Pittsfield, Mass., or polystyrenes.

For bonding polyolefins, it is desirable to use a core-shell polymer. The use of core-shell polymers in (meth)acrylate compositions is described, for example, in U.S. Pat. Nos. 4,536,546 and 4,942,201, each to Briggs et al. Core shell polymers are suitably graft copolymer resins, e.g., ABS graft copolymers, or others described in the above mentioned patents of Briggs et al., in the form of particles that include rubber or rubber-like cores or networks that are surrounded by relatively hard shells. In addition to improving the impact resistance of the bond, core-shell polymers can also impart enhanced spreading and flow properties to the composition. These enhanced properties include a reduced tendency for the composition to leave an undesirable "string" upon dispensing from a syringe-type applicator, or sap or slump after having been applied to a vertical surface. The quantity of toughener, when used, may suitably be in the range from about 1 wt. % to about 40 wt. %, preferably about 5 wt. % to about 25 wt. %, based on a total weight of the composition.

Reducing agents which may be useful in the compositions of the present invention include, but are not limited to, acetylphenylhydrazine, tetramethylthiourea, or thiocaprolactam.

Polymeric thickeners may be present in the compositions in a minor amount, up to about 50 wt. %, and may be thickeners such as a polymer or prepolymer of low or high molecular weight. Suitable polymeric thickeners are a commercially available methacrylate polymer sold under the trademark ELVACITE®, available from E.I. DuPont de Nemours, Wilmington, Del., as well as styrene-methyl methacrylate copolymers, polybisphenol-A-maleate, or propoxylated bisphenol-A-fumarate polyester sold under the trademark ATLAC® available from Reichhold, Inc., Research Triangle Park, N.C.

It is also possible to add inert filler materials such as finely divided silica, fumed silica (treated or untreated), montmorillonite, clay, bentonite and the like. The use of micronized silica can result in a paste-like thixotropic composition. Polymeric thickeners or other thickeners such as silica may suitably be present as a thickener in both Parts A and B of a two-part composition such that both parts preferably have similar viscosities. Inert fillers such as wood flour, cornstarch, glass fibers, cotton lintners, mica, alumina, silica, and the like may be used to modify viscosity, improve impact resistance, etc. Such fillers could be incorporated in the formulations of the present invention. The quantity of filler is suitably from about 0.5 wt. % to about 20 wt. %, for example about 1.0 wt. % to about 5.0 wt. %, based on a total weight of the composition.

It is a particular advantage of the invention that polyolefin and other low surface energy materials can be used as fillers in the composition. Polyolefin powders such as polyethylene powder are relatively inexpensive. In a composition which readily bonds to a polyolefin, the filler becomes securely adhered within the cured composition. Polyethylene or polypropylene powders can be used with particle sizes in the range from about 0.01 microns to about 1 micron, particularly about 0.02 microns to about 0.3 microns, allowing for a good control of the gap between substrates, i.e., the depth of adhesive. Particularly suitable polyethylene powders are commercially available under the trade name MICROTHENE® available from Equistar Chemicals LP, Houston, Tex. Polyethylene flock and polyolefin chopped fibers can also be used as fillers. The amount of polyolefin filler is about 0.5 wt. % to about 20 wt. %, preferably about 1.0 wt. % to about 10 wt. %, based on a total weight of the composition.

Small amounts of silane coupling agents may also be added to increase moisture resistance and well as to enhance bond strength with glass and similar surfaces. Other substances such as dyes, fire retarders, stabilizers such as quinones or hydroquinones, thixotropes, plasticizers, antioxidants, and the like may also be included, although such additives may often be furnished in the principal ingredients, making their separate introduction unnecessary.

In a two-part adhesive system including the (meth)acrylate composition of the present invention, Parts A and B may be provided in a weight ratio in the range from about 1:10 to 10:1, more preferably, about 1:5 to 5:1, and most preferably from about 1:2 to 2:1. Advantageously, the two-part adhesive system may be provided in a 1:1 ratio of Parts A and B for simple consumer use.

An exemplary two-part bonding adhesive composition according to the present invention includes, in Part A, about 85 wt. % of a (meth)acrylate component, about 4 wt. % trimethylolpropane-tris-(2-methyl-1-aziridinepropionate), about 0.25 wt. % n-butyl ferrocene, and about 8 wt. % fumed silica in the first part. Part B includes about 62 wt. % of a (meth)acrylate component, about 30 wt. % mono-2-(methacryloyloxy)ethyl maleate, about 2.4 wt. % benzoyl peroxide, and about 6 wt. % fumed silica. Both parts, when mixed together, can be used to bond polypropylene surfaces and provide a bond strength which on average exceeds 200 pounds per square inch (psi), and preferably, exceeds 250 psi.

EXAMPLES

The following examples illustrate the preferred embodiments of the invention. They are not intended to limit the scope of the invention. Instead, they are presented to facilitate the practice of the invention by those of ordinary skill in the art.

Example 1

A two-part adhesive composition was formulated. Part A contained 8.0 g tetrahydrofurfuryl methacrylate (THFMA), 2.5 g 2-ethylhexyl methacrylate (EHMA), 0.5 g trimethylolpropane tris-(2-methyl-1-aziridine propionate), 0.03 g n-butyl ferrocene, and 1.0 g fumed silica. Part B contained 8.0 g THFMA, 2.5 g EHMA, 5.0 g mono-2-(methacryloyloxy)ethyl maleate (MAOEtM), 0.4 g benzoyl peroxide, and 1.1 g fumed silica. Each part was mixed for about 20 seconds in a Model DAC-150 SPEED MIXER™ manufactured by FlackTek, Inc., Landrum, S.C. Both parts were manually mixed together in equal parts by weight in an aluminum dish for a time sufficient to homogenize the mixture, approximately 30 seconds. Block shear testing of the mixture in accordance with ASTM D 4501 was performed on two 1" square blocks of ¼" thick, natural, stress relieved, polypropylene sheets with a ½" overlap. The homogenized mixture was applied as a thin film to half of the surface of a first block and the second block was placed thereover with the ½" overlap. The two blocks were held together with a Hargrave #1 spring clamp. The blocks were compressed at a test speed of about ½" per minute. An average shear strength was determined to be 254 psi.

TABLE I

Block Shear Test

| Run No. | Shear strength (psi) |
| --- | --- |
| 1 | 148 |
| 2 | 426 |
| 3 | 288 |
| 4 | 132 |
| 5 | 278 |
| Avg. | 254 |

The (meth)acrylate compositions of the present invention provide a boron-free adhesive composition for bonding low energy surfaces. Polymerization can be controlled by controlling the ratio of the various constituents and the temperature. Unexpectedly, the multi-part adhesive system of the present invention has shown an average bond strength to low energy surface materials such as polyethylene and polypropylene in exess of about 200 psi. This is a higher bond strength for polyethylene and polypropylene substrates than has previously been attained with multi-part (meth) acrylate adhesive systems except by those containing boron compounds.

While the present invention has been particularly described, in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

What is claimed is:

1. A (meth)acrylate composition consisting essentially of:
    a (meth)acrylate component;
    a first initiator system for initiating polymerization of said (meth)acrylate component comprising
        an organometallic compound; and
        a peroxy compound; and
    a second initiator system for initiating polymerization of said (meth)acrylate component comprising
        an aziridine functionalized compound; and
        a compound having an acid functional group.

2. The composition of claim 1 wherein said (meth) acrylate component comprises one or more members selected from the group consisting of
    a monomer represented by Formula I:

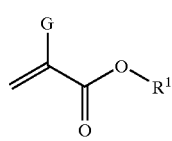

(I)

wherein G is hydrogen, halogen, or an alkyl having from 1 to 4 carbon atoms, $R^1$ has from 1 to 16 carbon atoms and is an alkyl, cycloalkyl, alkenyl, cycloalkenyl, alkaryl, aralkyl, or aryl group, optionally substituted or interrupted with silane, silicon, oxygen, halogen, carbonyl, hydroxyl, ester, carboxylic acid, urea, urethane, carbamate, amine, amide, sulfur, sulfonate, or sulfone;

a di- or tri-(meth)acrylate comprising polyethylene glycol di(meth)acrylates, bisphenol-A di(meth) acrylates, tetrahydrofurane di(meth)acrylates, hexanediol di(meth)acrylate, trimethylol propane tri (meth)acrylate, or combinations thereof; and an acrylate ester represented by Formula II:

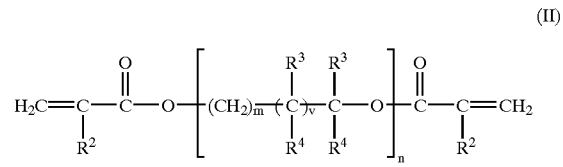

(II)

wherein $R^2$ is hydrogen, halogen, or an alkyl having about 1 to about 4 carbon atoms, $R^3$ is hydrogen, an alkyl having about 1 to about 4 carbon atoms, hydroxyalkyl having about 1 to about 4 carbon atoms or

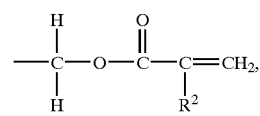

$R^4$ is hydrogen, hydroxy or

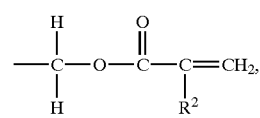

and
m is 1 to 8, n is 1 to 20, and v is 0 or 1.

3. The composition of claim 2 wherein said (meth) acrylate component comprises one or more members selected from the group consisting of methyl methacrylate, ethyl methacrylate, butyl methacrylate, cyclohexyl methacrylate, 2-ethylhexyl methacrylate, and tetrahydrofurfuryl methacrylate.

4. The composition of claim 1 wherein said organometallic compound is represented by Formula VI:

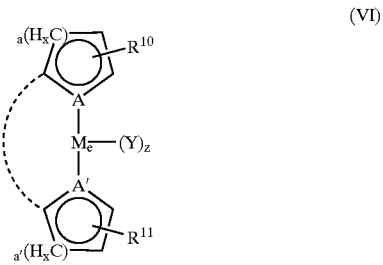

(VI)

wherein
    the dashed line optionally represents one or more bonds to form a five or six membered ring system;
    $M_e$ is a transition metal;
    $R^{10}$ and $R^{11}$ are same or different and each is a member selected from the group consisting of hydrogen, a straight or branched chain alkyl group having from about 1 to about 8 carbon atoms, acetyl, vinyl, allyl, hydroxyl, carboxyl, $-(CH_2)_bCOOR^{12}$, and $-(CH_2)_bOH$;
    wherein
    $R^{12}$ is a straight or branched chain alkyl group having from about 1 to about 8 carbon atoms, hydrogen, lithium, sodium or $-(CH_2)_b-OR^{13}$;

b is 1 to 8;

R$^{13}$ is a straight or branched chain alkyl group having from about 1 to about 8 carbon atoms or —(CH$_2$)$_b$N$^+$(CH$_3$)$_3$X$^-$; and X is a halogen, ClO$_4^-$, or BF$_4^-$;

Y is hydrogen, halogen, cyano, an alkoxy group having about 1 to about 4 carbon atoms, acetyl, hydroxyl, nitro, a trialkylamine, a triarylamine, a trialkylphosphine, or tosyl;

z is 0 up to an available valence of M$_e$;

x is 1 or 2;

a and a' are same or different and each is 1 or 2;

c and c' are same or different and each is 1 to 5 with the proviso that if a or a' is 1, then c and c' are each not greater than 4, and if a or a' is 2, then c and c' are each not greater than 5; and A and A' are same or different and each is carbon or nitrogen.

5. The composition of claim 4 wherein said organometallic compound is represented by Formula VII:

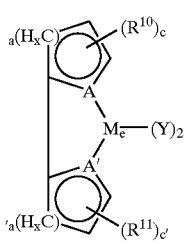

(VII)

wherein

M$_e$ is a metal selected from the group consisting of iron, titanium, chromium, copper, manganese, silver, zirconium, hafnium, niobium, vanadium, and molybdenum;

R$^{10}$ and R$^{11}$ are each hydrogen;

Y is halogen;

x is 1 or 2;

a and a' are each 2;

c and c' are each 1 to 5; and

A and A' are each nitrogen.

6. The composition of claim 4 wherein said organometallic compound is represented by Formula VIII:

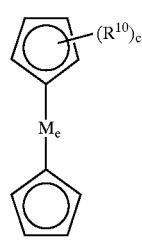

(VIII)

wherein

M$_e$ is a metal selected from the group consisting of iron, titanium, chromium, copper, manganese, silver, zirconium, hafnium, niobium, vanadium, and molybdenum; and R$^{10}$ is a member selected from the group consisting of hydrogen, a straight or branched chain alkyl group having from about 1 to about 8 carbon atoms, acetyl, vinyl, allyl, hydroxyl, carboxyl, —(CH$_2$)$_b$COOR$^{12}$, and —(CH$_2$)$_b$OH;

wherein

R$^{12}$ is a straight or branched chain alkyl group having from about 1 to about 8 carbon atoms, hydrogen, lithium, sodium or —(CH$_2$)$_b$—OR$^{13}$;

b is 1 to 8;

R$^{13}$ is a straight or branched chain alkyl group having from about 1 to about 8 carbon atoms or —(CH$_2$)$_b$N$^+$(CH$_3$)$_3$X$^-$;

X is a halogen, ClO$_4$—, or BF$_4$—; and c is 1 to 5.

7. The composition of claim 1 wherein said peroxy compound comprises an organic peroxide, an organic hydroperoxide, a perester, a peracid, or a mixture thereof.

8. A method of bonding low energy substrates comprising the steps of:

providing at least two substrates;

providing a (meth)acrylate adhesive composition consisting essentially of a (meth)acrylate component;

a dual two-part initiator system comprising a metallocene, a peroxy compound, an aziridine functionalized compound, and a compound having an acid functional group;

applying, on a surface of a first of the at least two substrates, the (meth)acrylate adhesive composition;

contacting the (meth)acrylate adhesive composition-coated surfaces of the at least two susbtrates;

curing the (meth)acrylate adhesive composition to provide a bond shear strength between the at least two substrates of greater than about 200 psi.

9. The method of claim 8 wherein in the step of providing a (meth)acrylate adhesive composition, the composition comprises of a two-part system wherein a first part comprises the (meth)acrylate component, the metallocene, and the peroxy compound; and a second part comprises the (meth)acrylate component, the aziridine functionalized compound, and the compound having an acid functional group.

* * * * *